Dec. 14, 1971     V. E. DI LUCIA     3,626,639
SPRING LOADED ALIGNMENT CLIP FOR CLOSURE FRAME MEMBERS
Filed June 16, 1970
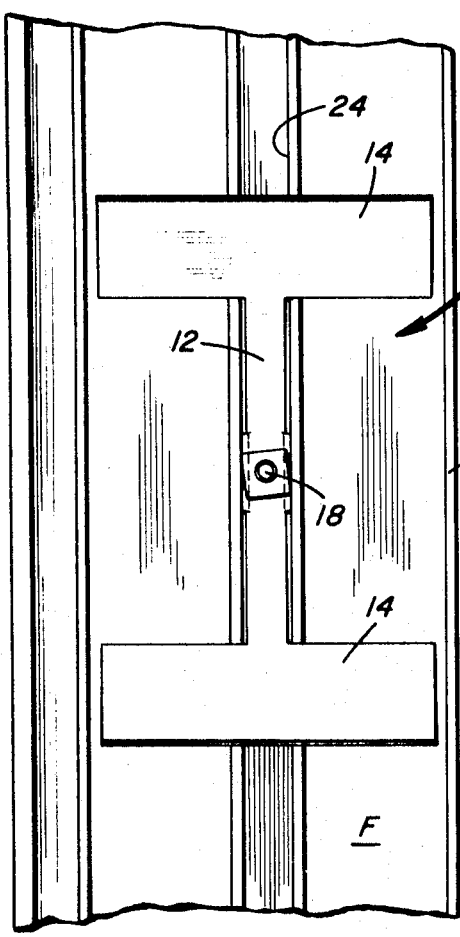
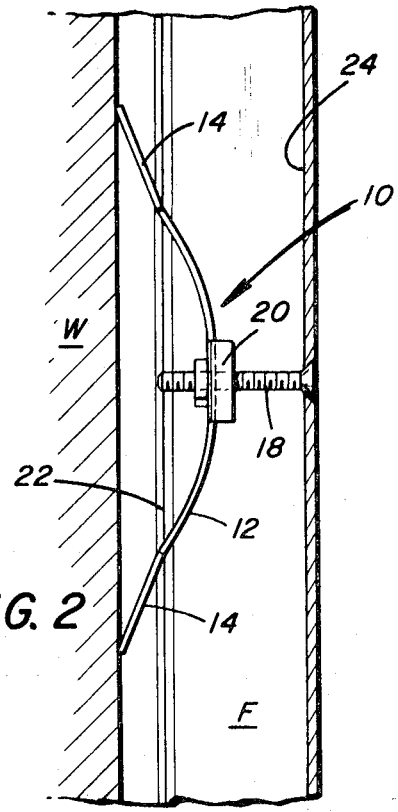
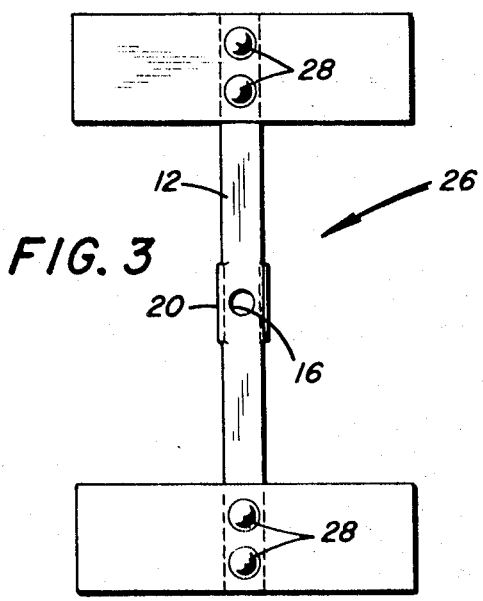
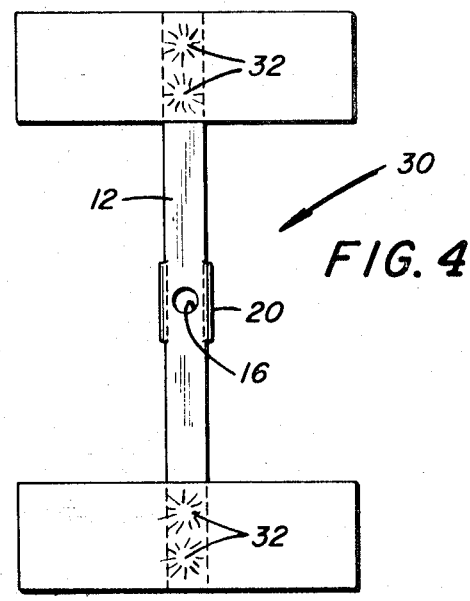
INVENTOR
VINCENT E. DiLUCIA

United States Patent Office 3,626,639
Patented Dec. 14, 1971

3,626,639
SPRING LOADED ALIGNMENT CLIP FOR CLOSURE FRAME MEMBERS
Vincent E. Di Lucia, Springfield, Pa., assignor to Bell Specialty Company, Inc., Phhiladelphia, Pa.
Filed June 16, 1970, Ser. No. 46,760
Int. Cl. E06b *1/04*
U.S. Cl. 49—505                                            1 Claim

ABSTRACT OF THE DISCLOSURE

A spring loaded alignment clip particularly adapted for window frame members to assure plumb line straightness of the frame members during installation and to provide adjustable sash tension, the said clip comprising a substantially flat leaf spring having an intermediate portion of reduced width and laterally extended end portions and screw threaded means to adjust the clip to desired tension.

---

The present invention relates to improvements in spring loaded alignment clips for closure frame members and is particularly adapted for use with window frame members to assure plumb line straightness of the frame members during installations and to provide adjustable sash tension.

The invention also relates to improvements in combined alignment clips and closure frames, particularly window frame members, and contemplates related clip and frame sidewall configurations adapted for receiving the clip in selected fixed position.

It is an object of the invention to provide a spring loaded alignment clip preferably in the form of a substantially flat tension spring the tension of which is adjustable by screw threaded means. In its preferred embodiment, the invention provides for a clip mountable upon an outer sidewall portion of the frame member and having extended bearing surfaces engagable with the wall defining the opening for the frame member, the screw threaded means being operable from the opposite or inner sidewall portion of the frame member to extend or retract the bearing surfaces as desired.

In a more specific embodiment, the invention provides for a channelled sidewall for the frame member and an alignment spring or clip having a reduced intermediate portion for seating in the sidewall channel and enlarged bearing surfaces at opposed end portions of the spring extending laterally beyond the channel. Thus, the intermediate portion of the spring is fixed in the channel against any rotary or transverse movement while the end bearing portions thereof remain freely extendable or retractable for selective adjustment of tension.

A more general object of the invention is to provide an alignment clip or an alignment clip and frame member assembly which avoids the use of preloaded or coil springs or the like which are susceptible to maladjustment and failure and which provides for a simple and extremely efficient and durable construction and arrangement of parts.

Other objects and advantages will be apparent from the following detailed description taken in conjunction with the accompanying drawings wherein preferred embodiments of the principles of the invention have been selected for exemplification.

In the drawings:

FIG. 1 is a plan view of an alignment clip in accordance with the invention shown attached to a channelled sidewall of a closure frame section, it being understood that a similar clip may be similarly attached to the opposite sidewall of the frame section and that a plurality of such clips may be employed if desired;

FIG. 2 is a vertical sectional view of FIG. 1;

FIG. 3 is a plan view of a modified form of clip; and

FIG. 4 is a plan view of a further modified form of clip.

Referring more particularly to the drawings, wherein like numerals refer to like parts, 10 designates in its entirety a form of alignment clip constructed in accordance with the invention.

The clip 10 is initially or normally substantially flat and may be conveniently integrally formed by stamping from a resilient steel sheet. As shown, the clip 10 is preferably provided with an intermediate portion 12 of reduced width and enlarged laterally extended end portions 14 which form bearing surfaces against the wall defining the frame opening W as shown in FIG. 2. Substantially centrally of the intermediate portion 12 an aperture 16 is provided for the free extremity of a threaded tension adjusting screw 18 which may have a receiving nut as shown in FIG. 2. Opposed parallel spaced flanges 20 may also be provided centrally of the reduced portion 12 to provide strength in the area of the aperture and also to form a squared seat, if desired, for non-rotatable reception of a receiving nut, not shown.

The sidewall portion 22 of the frame F, as shown in FIGS. 1 and 2, is preferably provided with an elongated channel 24 in which the intermediate portion 12 of the clip 10 is received and in which the adjusting screw 18 is supported. As will be apparent from FIGS. 1 and 2, rotation of the screw 18, usually clockwise, after threaded engagement with the clip 10 will draw or bow the intermediate portion 12 thereof interiorly of the channel 24 and urge the free end portions 14 thereof outwardly against the opening defining wall W appropriately to adjust the tension of the clip 10 to assure plumb line starightness of the frame member during installation and to provide adjustable sash tension.

The modified form of clips shown in FIGS. 3 and 4 function similarly to the integrally formed clip 10 as just described and may in some cases provide a more convenient form of construction. The clip indicated in its entirety at 26 is a three-piece assembly riveted together as shown at 28 and the clip indicated in its entirety at 30 is also a three-piece assembly but spot welded as shown at 32. The intermediate portion structures of the modified forms of clips may be the same as the clip 10, as shown in FIGS. 3 and 4.

It is to be understood that the present invention is not confined to the particular construction and arrangement of parts as herein illustrated and described but embraces all such modifications thereof as may come within the scope of the following claim.

I claim:
1. In a spring biased closure frame including a side wall having a channel in one face thereof, an elongated resilient alignment clip comprising, a substantially flat spring member having a narrow intermediate portion adapted to loosely fit in said channel and having laterally extending end portions bridging said channel and providing resilient bearing surfaces, screw reception means located centrally of said intermediate portion and screw means extending through said channel from the opposite face thereof threadingly engaging said intermediate portion, whereby the screw means is utilized to adjust the tension in the resilient bearing surfaces as desired.

References Cited
UNITED STATES PATENTS
929,729     8/1909     Thompson _____ 49—417
2,725,603  12/1955    Curtze _____ 49—417

KENNETH DOWNEY, Primary Examiner

U.S. Cl. X.R.
49—417, 452